Feb. 15, 1938. G. W. COOPER 2,108,252

CLUTCH SLEEVE SPRING TOOL

Filed April 23, 1937

INVENTOR.
George W. Cooper
BY Lancaster, Allwine and Rommel
ATTORNEYS.

Patented Feb. 15, 1938

2,108,252

UNITED STATES PATENT OFFICE 2,108,252

CLUTCH SLEEVE SPRING TOOL

George W. Cooper, Muncie, Ind., assignor of one-quarter to Frank E. Hill and one-quarter to William Miller, both of Muncie, Ind.

Application April 23, 1937, Serial No. 138,655

7 Claims. (Cl. 29—87.1)

This invention relates to work holding devices and more particularly to a device or tool for resetting the springs of clutch throw-out bearing sleeves, which form a portion of clutch assemblies associated with the drive means of motor vehicles.

Clutch throwout bearing sleeves are contained within the clutch housing and are provided with springs which confine and resiliently retain the ends of clutch pressure levers, also associated with clutch assemblies. These bearing sleeves are so positioned that there is but a very limited space for any manipulation by the fingers of the hand or the insertion of a lever or the like into the clutch housing.

An important object of the invention is to provide a tool for resetting the springs, without the necessity of manipulating the springs with the fingers.

Another important object is to provide a spring resetting device or tool which permits the easy manipulation of the springs to an initially set position while the clutch throwout bearing sleeve is outside the clutch housing, and, subsequently manipulating the tool, when the sleeve is in position within the housing, so that the springs will move to correct positions with respect to the ends of the clutch pressure levers, this being positive.

Still another object is to provide a device or tool as above, which will obviate injury to the hands and fingers of the user, since the springs may be reset and sprung to positions so as to confine the free ends of the levers, without the necessity of bringing the fingers into contact with the springs or levers.

Another object is to provide a tool, of simple construction, containing no delicate parts or parts subject to breakage, and a tool that may be manufactured at a relatively low cost.

Other objects and advantages of the invention will be apparent during the course of the following detailed description, taken in connection with the accompanying drawing, forming a part of the specification and in which drawing:—

In the drawing, wherein for the purpose of illustration is shown a preferred embodiment of the invention and wherein similar reference characters designate corresponding parts throughout the several views, the letter A may designate generally a clutch assembly and the letter B the novel tool.

Figure 3:
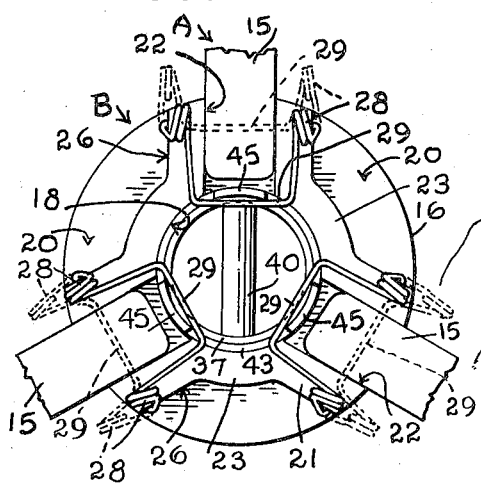
Figure 3 is a forward end plan view of the tool, carrying the clutch throwout bearing sleeve, as it would appear when inserted into a clutch housing, fragments of the clutch pressure levers being also shown.

The clutch assembly A, shown by way of illustration, includes a flywheel 10, against which a clutch disc 11 is urged by a clutch pressure plate 12 which, in turn, is urged by clutch springs 13. The clutch is disengaged, in part, by a plurality of clutch pressure levers 14, which extend radially towards the axis of the flywheel 10, their free ends 15 being nearest this axis.

Included in the clutch disc engaging means and associated with these levers 14, is a clutch throwout bearing sleeve 16. Such a sleeve includes a disc portion 17 having a central opening 18 and, of course, two faces 19 and 20. From the face 20, which may be called the inner or lever end face, extend a plurality of lugs 21. In the example shown, these lugs 21 are spaced apart in pairs, and extend from the central opening 18 to the outer edge of the disc portion 17, so that there is a slot 22 extending from this outer edge to the central opening 18 and defined by the walls of two adjacent lugs 21 and the face 20 of the disc portion. Normally, the free ends 15 of the levers 14 extend into the slots 22, each slot accommodating one lever end. Generally, each two lugs 21, none of a pair, are joined at their inner ends by portions 23 of a collar which extends about the central opening 18, joining the lugs but not closing the slots 22, as shown particularly in Figure 2.

Each pair of lugs 21 receives the free end of a wire bow spring 24, through perforations 25 extending inwardly of the lugs from the outer faces 26 thereof. These springs 24 have a pivotal connection with the lugs 21, with a portion 27 of the spring, adjacent each end thereof, extending from the perforations 25 and then coiled into a few turns 28 after which the spring extends in a bight portion 29, particularly as shown in Figures 2 and 3. As may be seen in Figure 3, this bight portion 25 is wider than the slots 22 and wider than the free ends 15 of the levers 14. Against the tension of the turns 28, the springs 24 may be drawn towards the central opening 18, but their normal position, when the clutch throwout bearing sleeve 16 is in place, is with the bight portion 29 bridging the slots 22, as shown by dotted lines in Figure 3, so that the free ends of the levers 14 are resiliently retained or held by the springs. The association of the levers 14, with respect to the clutch throwout bearing sleeve 16 is shown in Figure 1.

Figure 1:
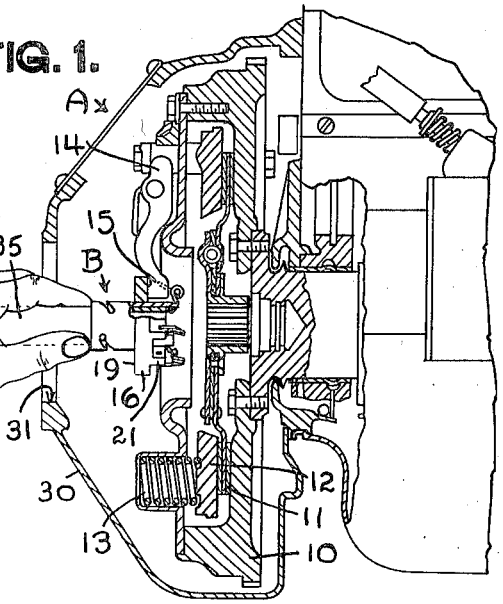
Figure 1 is a vertical section through a clutch assembly and showing the method of inserting the novel tool.
Figure 4:
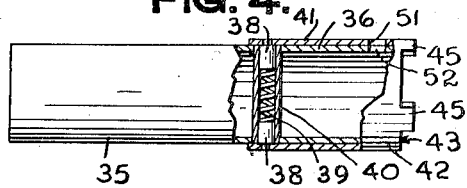
Figure 4 is a side elevation of the novel tool, parts being broken away in order to better illustrate portions of the interior construction.
Figure 2:
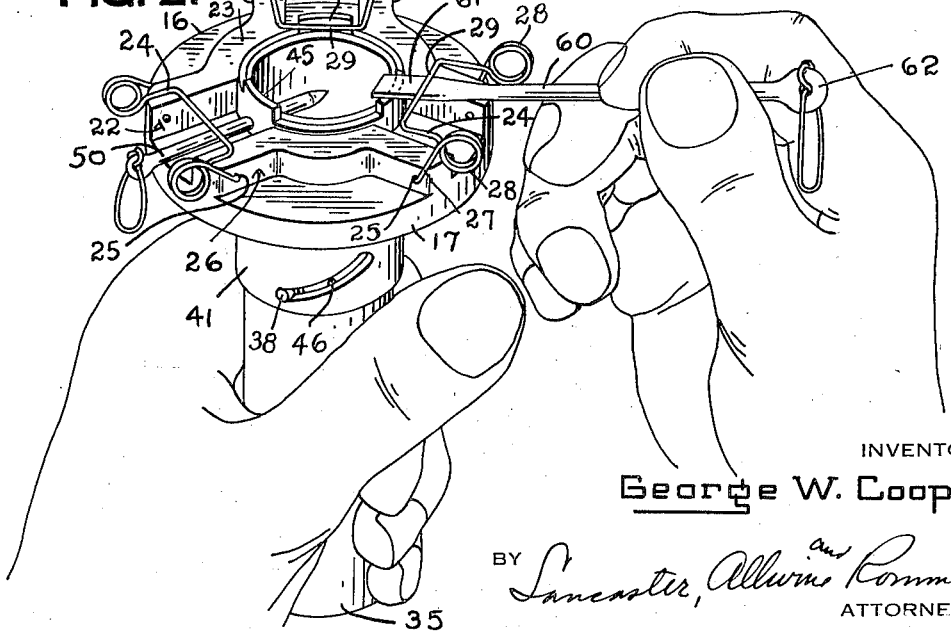
Figure 2 is a perspective view of the novel tool, illustrating the method of initially setting the springs of the clutch throwout bearing sleeve, which is also shown.

Housing the clutch assembly described, is a suitable clutch housing 30, having a central opening 13, as shown in Figure 1, with the axis of the opening substantially aligning with the axis of the clutch throwout bearing sleeve 16 when the latter is in place.

As for the novel tool B, the same preferably includes a handle portion 35, which may be a metallic tube having a forward end 36 and a forward edge 37. This handle portion 35 is of a length and circumference so that it may be easily grasped and held in the hand, as shown in Figure 2. Any suitable means may be employed to provide one or more pins or projections 38, extending radially from the outer periphery of the handle portion 35, preferably at the forward end 36. In the example shown, two pins 38 are employed and these extend and are slidable through suitable perforations in the handle portion 35. At their inner ends, the pins 38 are urged outwardly by a suitable expansion coil spring 39, housed in a tube 40 extending across the interior of the tubular handle portion and suitably secured to the walls thereof.

Preferably slidable over the outer periphery of the tubular handle portion 35 is a sleeve portion 41, which is positioned at the forward end 36. This sleeve 41 also has a forward end 42, a forward edge 43 and a rearward edge 44. Extending longitudinally from the forward edge 43 are a plurality of spaced apart lugs 45, there being as many lugs as there are springs 24 and the width of these lugs 45 is somewhat less than the width of the bight portions 29 of the springs 24.

Figure 5:
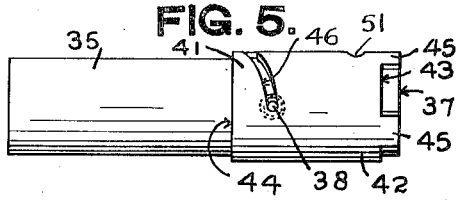
Figure 5 is a side elevation of the new tool.

Cooperating with the pins 38, are slots 46 which, as shown in Figures 2 and 5, extend from adjacent the rearward edge 44 towards the forward edge 43 of the sleeve portion 41, preferably diagonal to said edges. The pins 38 extend into these slots 46 and, upon rotation of the sleeve portion 41 (or rotation of the handle portion 35), the pins will travel in the slots, thus limiting movement of the two portions 45 and 41 longitudinally of each other. The location and length of the slots 46 should be such that when the pins are nearest the rear edge 44, the lugs 45 will project beyond the plane of the forward edge 37 of the handle portion 35 and, preferably, with the forward edges 37 and 43 occupying substantially the same plane. When the pins 38 occupy the opposite ends of the slots 46, the extremities of the free ends of the lugs 45 will be at or below the plane of the forward edge 37.

Since the clutch throwout bearing sleeve 16 is to be mounted upon the sleeve portion 41 of the novel tool during setting of the spring 24, with the disc portion 17 encircling the sleeve portion 41, the circumference of the outer periphery of the sleeve portion 41 must be slightly less than the circumference of the central opening 18 in the disc portion 17.

Means for both locking the sleeve portion 41 to the handle portion 37 and limiting movement of the clutch throwout bearing sleeve 16 outwardly towards the forward edge 42 of the sleeve portion 41, may be provided. This may constitute a suitable pin 50 slidable through aligning perforations 51 and 52 in the sleeve portion 41 and handle portion 37 respectively. These perforations 51 and 52 are adapted to align when the lugs 45 extend beyond the forward edge 42 of the handle portion 37. This pin 50 may be inserted by moving the clutch throwout bearing sleeve 16 with respect to the sleeve portion 41 so that it may extend longitudinally through a slot 21, as clearly shown in Figure 2.

Means for setting the springs 24 with their bight portions 29 extending about or over the lugs 45 and in engagement with them, may constitute a hand lever 60. Preferably, this is a length of suitable material having a flattened free end 61. By extending this free end 61 under the bight portion 29 of a spring 24 and disposing this end upon the free end of a lug 45 and moving the opposite or finger hold end 62 of the lever 60 in an arc towards the axis of the central opening 18, will cause the spring 24 to move until the bight portion 29 thereof will slip along the lever 60 and snap over the lug 45, as shown in Figure 2, with the spring 24 under considerable tension.

When each spring 24 is in this tensioned position, the pin 50 and, of course, the lever 60, are withdrawn and the tool, with the handle portion grasped by the operator's hand and carrying the clutch throwout bearing sleeve 16, may be inserted into the opening 31 in the clutch housing 30 until the free ends 15 of the levers 14 are in the slots 22. Now, by rotating the handle portion 35 with respect to the sleeve portion 41, the handle portion 35 will move forward longitudinally of the sleeve portion until the forward edge 47 engages the bight portions of the springs 24 and will urge the bights along the lugs 45 until the bights clear the lugs, whereupon the springs will snap to their normal positions, shown in dotted lines in Figure 3. The tool may now be readily removed from the clutch throwout bearing sleeve 16, since the latter will slide off the sleeve portion (although the sleeve portion cannot slide off the handle portion), and from the clutch housing 30.

It is preferred to employ some movable projection, like the pins 38, so that the sleeve portion may be readily placed over the handle portion, with the spring-urged pins 38 depressed. It is now apparent that this is readily accomplished and when the pins align with the slots 46, they will spring into these slots.

From the foregoing it will be seen that there is no need to fumble with the clutch throwout bearing sleeve springs with the hand, either in a confined space or even when the tool is employed and manipulated as shown in Figure 2. Consequently, there will be no injury to the operator's fingers and the clutch throwout bearing sleeve may be properly replaced with ease and dispatch.

Various changes may be made to the form of invention herein shown and described, without departing from the spirit of the invention or the scope of the claims.

What is claimed is:

1. In a clutch throwout bearing sleeve spring resetting tool, a handle portion having a forward end and a forward edge, and a second portion at the forward end of said first portion and having a forward edge with a plurality of spaced apart lugs projecting longitudinally from said forward edge, one of said portions being movable longitudinally of the other portion, the outer circumference of one of said portions being very slightly less than the central opening through a conventional clutch throwout bearing sleeve and the greatest width of each of said lugs being less than the width of that portion of each of the springs, associated with said conventional clutch throwout bearing sleeve, which normally confines the free ends of conventional clutch pressure levers.

2. In a clutch throwout bearing sleeve spring resetting tool, a handle portion having a forward end and a forward edge, a second portion at the forward end of said first portion and having a forward edge with a plurality of spaced apart lugs projecting longitudinally from said forward edge, one of said portions being movable longitudinally of the other portion, the outer circumference of one of said portions being very slightly less than the central opening through a conventional clutch throwout bearing sleeve and the greatest width of each of said lugs being less than the width of that portion of each of the springs, associated with said conventional clutch throwout bearing sleeve, which normally confines the free ends of conventional clutch pressure levers, and means for locking said handle and second portions against movement longitudinally of each other.

3. In a clutch throwout bearing sleeve spring resetting tool, a handle portion having a forward end and a forward edge, a second portion at the forward end of said first portion and having a forward edge with a plurality of spaced apart lugs projecting longitudinally from said forward edge, one of said portions being movable longitudinally of the other portion, the outer circumference of one of said portions being very slightly less than the central opening through a conventional clutch throwout bearing sleeve and the greatest width of each of said lugs being less than the width of that portion of each of the springs, associated with said conventional clutch throwout bearing sleeve, which normally resiliently retain the free ends of conventional clutch pressure levers, means for locking said handle and second portions against movement longitudinally of each other, and means for setting said springs, with said portions of said springs in engagement with said lugs.

4. In a clutch throwout bearing sleeve spring resetting tool, a handle portion having a forward end and a forward edge, a pin extending outwardly radially from said handle portion, and a sleeve about the forward end of said handle portion, said sleeve having a forward end, a forward edge and a rearward edge, with a plurality of spaced apart lugs projecting longitudinally from said forward edge, said sleeve having a slot extending from inwardly of said rearward edge towards said forward edge, with said pin projecting into said slot, the outer circumference of said sleeve being very slightly less than the central opening through a conventional clutch throwout bearing sleeve and the greatest width of said lugs being less than the width of that portion of each of the springs associated with said conventional clutch throwout bearing sleeve which normally resiliently retain the free ends of conventional clutch pressure levers.

5. In combination with a conventional clutch throwout bearing sleeve having a central opening, a plurality of lugs and a plurality of bow springs pivoted to said lugs, a clutch throwout bearing sleeve spring resetting tool including a handle portion having a forward end and a forward edge, a pin extending outwardly radially from said handle portion, a sleeve about the forward end of said handle portion, said sleeve having a forward end, a forward edge and a rearward edge with a plurality of spaced apart lugs projecting longitudinally from said forward edge, said sleeve having a slot extending from inwardly of said rearward edge diagonally towards said forward edge with said pin projecting into said slot, the outer circumference of said sleeve portion being very slightly less than said central opening and the greatest width of each of said last-named lugs being less than the width of the bight portion of said springs, and means for setting said springs into engagement with said last-named lugs, with said bight portions of said springs disposed over said lugs.

6. In combination with a conventional clutch throwout bearing sleeve having a central opening, a plurality of ears and a plurality of bow springs pivoted to said ears, a clutch throwout bearing sleeve spring resetting tool including a handle portion having a forward end and a forward edge, a pin extending outwardly radially from said handle portion, a sleeve about the forward end of said handle portion, said sleeve having a forward end, a forward edge and a rearward edge with a plurality of spaced apart lugs projecting longitudinally from said forward edge, said sleeve having a slot extending from inwardly of said rearward edge diagonally towards said forward edge with said pin projecting into said slot, the outer circumference of said sleeve portion being very slightly less than said central opening and the greatest width of each of said lugs being less than the width of the bight portion of said springs, means for setting said springs into engagement with said lugs, with said bight portions of said springs disposed over said lugs, and means for locking said sleeve portion against movement longitudinally of said handle portion.

7. In combination with a conventional clutch throwout bearing sleeve having a central opening, a plurality of ears and a plurality of bow springs pivoted to said ears, a clutch throwout bearing sleeve spring resetting tool including a handle portion having a forward end and a forward edge, a pin extending outwardly radially from said handle portion, a sleeve about the forward end of said handle portion, said sleeve having a forward end, a forward edge and a rearward edge with a plurality of spaced apart lugs projecting longitudinally from said forward edge, said sleeve having a slot extending from inwardly of said rearward edge diagonally towards said forward edge with said pin projecting into said slot, the outer circumference of said sleeve portion being very slightly less than said central opening and the greatest width of each of said lugs being less than the width of the bight portion of said springs, means for setting said springs into engagement with said lugs, with said bight portions of said springs disposed over said lugs, and means for locking said sleeve portion against movement longitudinally of said handle portion, said slot being disposed so that when said pin moves from one end of said slot to the other end thereof, said sleeve portion will move longitudinally of said handle portion to a position wherein the free ends of said lugs will project beyond the forward edge of said handle portion and when said pin moves from the other end of said slot to said first end thereof, the free ends of said lugs will be inwardly of the plane of said forward edge of said handle portion.

GEORGE W. COOPER.